US008585197B2

(12) United States Patent
Aoki et al.

(10) Patent No.: US 8,585,197 B2
(45) Date of Patent: Nov. 19, 2013

(54) METHOD FOR PRINTING NON-AQUEOUS INK AND PRINTING SUBSTRATE FOR NON-AQUEOUS INK

(75) Inventors: Satoshi Aoki, Ibaraki-ken (JP); Yoshifumi Watanabe, Ibaraki-ken (JP); Ami Terakado, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 45 days.

(21) Appl. No.: 13/460,879

(22) Filed: May 1, 2012

(65) Prior Publication Data

US 2012/0293581 A1 Nov. 22, 2012

(30) Foreign Application Priority Data

May 16, 2011 (JP) ................................ P2011-109401
Dec. 19, 2011 (JP) ................................ P2011-276755

(51) Int. Cl.
*C09D 11/00* (2006.01)

(52) U.S. Cl.
USPC .......................................................... 347/100

(58) Field of Classification Search
USPC .................................................... 347/20, 100
See application file for complete search history.

(56) References Cited

U.S. PATENT DOCUMENTS

| | | | | |
|---|---|---|---|---|
| 2012/0262517 | A1 * | 10/2012 | Takaku et al. | 347/20 |
| 2013/0050332 | A1 * | 2/2013 | Aoki et al. | 347/20 |

FOREIGN PATENT DOCUMENTS

| | | | |
|---|---|---|---|
| JP | 2005-193660 | A | 7/2005 |
| JP | 2007-126564 | A | 5/2007 |

* cited by examiner

*Primary Examiner* — Laura Martin
(74) *Attorney, Agent, or Firm* — Nath, Goldberg & Meyer; Jerald L. Meyer; Scott C. Langford

(57) ABSTRACT

A method for printing a non-aqueous ink onto a printing substrate, using a non-aqueous ink including a coloring material and a non-aqueous solvent is provided, wherein the non-aqueous ink has a total surface free energy, calculated from the Kaelble-Uy theoretical formula, of 25 to 30 mN/m, and a dispersive component ratio of 0.55 to 0.75, and the printing substrate has a coating layer containing inorganic particles, has a total surface free energy, calculated from the Kaelble-Uy theoretical formula, of 30 to 50 mN/m, has a dispersive component ratio of 0.80 to 1.0, and exhibits a liquid absorption property for the inorganic particles of 0.30 or greater. The method for printing a non-aqueous ink enables roller transfer staining to be suppressed while maintaining high image density.

6 Claims, No Drawings

METHOD FOR PRINTING NON-AQUEOUS INK AND PRINTING SUBSTRATE FOR NON-AQUEOUS INK

CROSS REFERENCE TO RELATED APPLICATIONS

This application is based upon and claims the benefit of priority from prior Japanese Patent Applications No. 2011-109401 filed on May 16, 2011 and No. 2011-276755 field on Dec. 19, 2011, the entire contents of which are incorporated by reference herein.

BACKGROUND OF THE INVENTION

1. Field of the Invention

The present invention relates to a method for printing a non-aqueous ink and a printing substrate for a non-aqueous ink that enable roller transfer staining to be suppressed while maintaining high image density.

2. Description of the Related Art

The inkjet printing system is a system in which an inkjet ink having high fluidity is sprayed in the form of ink particles from very fine head nozzles, thereby printing an image onto a printing substrate positioned facing the nozzles, and because high-speed printing can be achieved, particularly in those cases where a line head inkjet printing apparatus containing a plurality of ink heads is used, inkjet printing has become very widespread in recent years.

Inkjet inks can be broadly classified into aqueous inks and non-aqueous inks. Non-aqueous inks are less likely to cause curling or cockling of the printing substrate, thereby facilitating transport of the printing substrate, and are therefore ideal for high-speed printing.

Numerous so-called non-aqueous inks prepared by finely dispersing a pigment within a solvent have been proposed as inks for use within the above type of inkjet printing systems.

For example, the applicant has proposed, in Patent Document 1, a non-aqueous ink comprising a pigment dispersed in a solvent that includes an ester solvent, a higher alcohol solvent and a hydrocarbon solvent. This ink exhibits excellent stability within the printer, and a printed item produced using this ink offers the advantage that, even when laid on top of a printed item printed using a PPC transfer device or a laser printer with the printed surfaces facing each other, the printed images do not stick together.

On the other hand, non-aqueous inks suffer from poor separation of the solvent from the coloring material on the printing substrate, and particularly in those cases where a plain paper is used as the printing substrate, the coloring material and the solvent tend to be prone to penetrating together into gaps between the fibers of the printing substrate, resulting in a reduction in the image density. Here, the term "plain paper" refers to a paper that is not provided with a coating layer.

In response to this problem of reduced image density, a method of obtaining a printed item having high image density has been proposed in which the printed item is produced, using a non-aqueous ink, on a plain paper comprising mainly a pulp and a filler containing mainly a rosette-shaped light calcium carbonate, and also comprising a polymeric compound as a sizing agent, wherein the Stoeckigt sizing degree is within a range from 5 to 80 seconds, and the ash content prescribed in JIS-P8251 is within a range from 20 to 40% (see Patent Document 2).

However, in this method, although the image density increases, the effect of the large ash content of the printing substrate means that the coloring material is more likely to be retained on the surface of the printing substrate. As a result, when the printed item is pressed against a roller, the coloring material may be transferred to the roller, and this transferred coloring material can then be re-transferred to the subsequently transported printed item, thereby soiling the printed item and generating so-called roller transfer staining.

[Patent Document 1] JP 2007-126564 A

[Patent Document 2] JP 2005-193660 A

The present invention has an object of providing a method for printing a non-aqueous ink and a printing substrate for a non-aqueous ink that enable roller transfer staining to be suppressed while maintaining high image density.

SUMMARY OF THE INVENTION

One aspect of the present invention is a method for printing onto a printing substrate using a non-aqueous ink comprising a coloring material and a non-aqueous solvent, wherein the non-aqueous ink has a total surface free energy, calculated from the Kaelble-Uy theoretical formula, of 25 to 30 mN/m, and a dispersive component ratio represented by a formula (1) shown below of 0.55 to 0.75, and the printing substrate has a coating layer comprising inorganic particles, has a total surface free energy, calculated from the Kaelble-Uy theoretical formula, of 30 to 50 mN/m, has a dispersive component ratio represented by the formula (1) of 0.80 to 1.0, and exhibits a liquid absorption property for the inorganic particles, represented by a formula (2) shown below, of 0.30 or greater.

Dispersive component ratio $\gamma dr=\gamma d/\gamma$ Formula (1)

$\gamma$dr: dispersive component ratio $\gamma$d: surface free energy of dispersive component $\gamma$: total surface free energy Liquid absorption property of inorganic particles: $A=B/C$ Formula (2)

A: liquid absorption property of inorganic particles

B: oil absorption of inorganic particles (ml/100 g)

C: specific surface area of inorganic particles ($m^2/g$)

In the formula (2), the oil absorption represented by B refers to a value obtained in accordance with the linseed oil absorption measurement method prescribed in JIS K5101-21, and the specific surface area represented by C refers to a value obtained by a method of measuring the specific surface area using the BET method.

Another aspect of the present invention is a printing substrate for use with a non-aqueous ink, the non-aqueous ink comprising a coloring material and a non-aqueous solvent, and having a total surface free energy, calculated from the Kaelble-Uy theoretical formula, of 25 to 30 mN/m, and a dispersive component ratio represented by a formula (1) shown below of 0.55 to 0.75, wherein the printing substrate has a coating layer comprising inorganic particles, has a total surface free energy, calculated from the Kaelble-Uy theoretical formula, of 30 to 50 mN/m, has a dispersive component ratio represented by the formula (1) of 0.80 to 1.0, and exhibits a liquid absorption property for the organic particles, represented by a formula (2) shown below, of 0.30 or greater.

Dispersive component ratio $\gamma dr=\gamma d/\gamma$ Formula (1)

$\gamma$dr: dispersive component ratio $\gamma$d: surface free energy of dispersive component $\gamma$: total surface free energy Liquid absorption property of inorganic particles: $A=B/C$ Formula (2)

A: liquid absorption property of inorganic particles

B: oil absorption of inorganic particles (ml/100 g)

C: specific surface area of inorganic particles ($m^2/g$)

In the formula (2), the oil absorption represented by B refers to a value obtained in accordance with the linseed oil absorption measurement method prescribed in JIS K5101-21, and the specific surface area represented by C refers to a value obtained by a method of measuring the specific surface area using the BET method.

DETAILED DESCRIPTION OF THE EMBODIMENTS

As a result of intensive investigation, the inventors of the present invention discovered that by performing printing using a non-aqueous ink having specific properties and a printing substrate having specific properties, roller transfer staining could be suppressed while maintaining a high image density, and they were therefore able to complete the present invention.

In other words, a first embodiment of the present invention provides a method for printing onto a printing substrate using a non-aqueous ink comprising a coloring material and a non-aqueous solvent, wherein the non-aqueous ink has a total surface free energy, calculated from the Kaelble-Uy theoretical formula, of 25 to 30 mN/m, and a dispersive component ratio represented by a formula (1) shown below of 0.55 to 0.75, and the printing substrate has a coating layer comprising inorganic particles, has a total surface free energy, calculated from the Kaelble-Uy theoretical formula, of 30 to 50 mN/m, has a dispersive component ratio represented by the formula (1) of 0.80 to 1.0, and exhibits a liquid absorption property for the inorganic particles, represented by a formula (2) shown below, of 0.30 or greater.

Dispersive component ratio $\gamma dr=\gamma d/\gamma$ Formula (1)

$\gamma$dr: dispersive component ratio $\gamma$d: surface free energy of dispersive component $\gamma$: total surface free energy Liquid absorption property of inorganic particles:

$A=B/C$ Formula (2)

A: liquid absorption property of inorganic particles

B: oil absorption of inorganic particles (ml/100 g)

C: specific surface area of inorganic particles ($m^2/g$)

In the formula (2), the oil absorption represented by B refers to a value obtained in accordance with the linseed oil absorption measurement method prescribed in JIS K5101-21, and the specific surface area represented by C refers to a value obtained by a method of measuring the specific surface area using the BET method.

The Kaelble-Uy theoretical formula assumes that the total surface free energy is composed of a dispersive component $\gamma$d and a polar component $\gamma$p, and represents the total surface free energy $\gamma$ as $\gamma=\gamma d+\gamma p$ (formula 3).

Further, if the surface energy of the surface of a liquid is represented by $\gamma$l, the surface energy of a solid is represented by $\gamma$s, and a contact angle between the two is represented by $\theta$, then $\gamma l(1+\cos\theta)=2\sqrt{\gamma sd\gamma ld}+2\sqrt{\gamma sp\gamma lp}$ (formula 4) is obtained.

Accordingly, by using two liquids for which the $\gamma$l component is known, measuring the contact angle $\theta$ for each of the liquids, and solving the simultaneous equations relating to $\gamma$sd and $\gamma$sp, the value of $\gamma$s can be determined.

In a similar manner, by using the Kaelble-Uy theoretical formula, the total surface free energy $\gamma$xd, $\gamma$xp of the non-aqueous ink can be calculated.

The total surface free energy of the non-aqueous ink can be determined by measuring the surface tension of the non-aqueous ink, measuring the interfacial tension with the known solvent water, and then solving the simultaneous equations.

The total surface free energy component of water $\gamma$w is represented by $\gamma w=\gamma wd+\gamma wp$ (formula 5).

Further, if the interfacial tension between the non-aqueous ink X and water is represented by $\gamma$wx, then $\gamma wx=\gamma w+\gamma x-2\sqrt{\gamma wd\gamma xd}-2\sqrt{\gamma wp\gamma xp}$ (formula 6).

By measuring the interfacial tension $\gamma$wx, and solving the quadratic equation with two unknowing for the conditions $\gamma xd\geq 0$ and $\gamma xp\geq 0$, the two components for the non-aqueous ink X can be determined.

Further, another embodiment of the present invention provides a printing substrate for use with a non-aqueous ink, the non-aqueous ink comprising a coloring material and a non-aqueous solvent, and having a total surface free energy, calculated from the Kaelble-Uy theoretical formula, of 25 to 30 mN/m, and a dispersive component ratio represented by the formula (1) shown above of 0.55 to 0.75, wherein the printing substrate has a coating layer comprising inorganic particles, has a total surface free energy, calculated from the Kaelble-Uy theoretical formula, of 30 to 50 mN/m, has a dispersive component ratio represented by the formula (1) of 0.80 to 1.0, and exhibits a liquid absorption property for the inorganic particles, represented by the formula (2) shown above, of 0.30 or greater.

According to the present invention, in the printing method of discharging a non-aqueous ink comprising a coloring material and a solvent onto a printing substrate, printing is conducted using a non-aqueous ink having a total surface free energy $\gamma$, calculated from the Kaelble-Uy theoretical formula, of 25 to 30 mN/m, and a dispersive component ratio represented by the formula (1) shown below of 0.55 to 0.75, and the printing is performed onto a printing substrate which has a coating layer comprising inorganic particles, has a total surface free energy of 30 to 50 mN/m, has a dispersive component ratio of 0.80 to 1.0, and exhibits a liquid absorption property for the inorganic particles, represented by the formula (2) shown below, of 0.30 or greater, and as a result, roller transfer staining can be suppressed while maintaining high image density.

Dispersive component ratio $\gamma dr=\gamma d/\gamma$ Formula (1)

$\gamma$dr: dispersive component ratio $\gamma$d: surface free energy of dispersive component $\gamma$: total surface free energy Liquid absorption property of inorganic particles:

$A=B/C$ Formula (2)

A: liquid absorption property of inorganic particles

B: oil absorption of inorganic particles (ml/100 g)

C: specific surface area of inorganic particles ($m^2/g$)

In the formula (2), the oil absorption represented by B refers to a value obtained in accordance with the linseed oil absorption measurement method prescribed in JIS K5101-21, and the specific surface area represented by C refers to a value obtained by a method of measuring the specific surface area using the BET method.

In other words, by ensuring that the affinity between the non-aqueous ink and the printing substrate, and the ink absorption properties satisfy the respective ranges described above, the non-aqueous ink can penetrate rapidly into the printing substrate while undergoing satisfactory fixing, and therefore a printed item can be obtained that exhibits a high image density and suppressed roller transfer staining.

Even in those cases where the total surface free energy of the non-aqueous ink is within a range from 25 to 30 mN/m and the dispersive component ratio of the non-aqueous ink is within a range from 0.55 to 0.75, if the total surface free energy of the printing substrate is less than 30 mN/m or greater than 50 mN/m, or the dispersive component ratio of the printing substrate is less than 0.80, then the printing substrate is unable to satisfactorily absorb the non-aqueous ink, and roller transfer staining cannot be satisfactorily suppressed.

Even in those cases where the total surface free energy of the printing substrate is within a range from 30 to 50 mN/m and the dispersive component ratio of the printing substrate is within a range from 0.80 to 1.0, if the total surface free energy of the ink is less than 25 mN/m or greater than 30 mN/m, or the dispersive component ratio of the ink is less than 0.55 or greater than 0.75, then the printing substrate is unable to satisfactorily absorb the non-aqueous ink, a high image density is unobtainable, and roller transfer staining cannot be satisfactorily suppressed. Further, if the liquid absorption property of the inorganic particles is less than 0.30, then a satisfactory image density cannot be ensured.

Further, a non-aqueous ink having a total surface free energy γ calculated from the Kaelble-Uy theoretical formula of 25 to 30 mN/m, and a dispersive component ratio represented by the formula (1) of 0.60 to 0.70 is preferred as the non-aqueous ink.

Furthermore, a printing substrate having a total surface free energy calculated from the Kaelble-Uy theoretical formula of 35 to 50 mN/m, and a dispersive component ratio of 0.90 to 1.0, wherein the inorganic particles have a liquid absorption property represented by the formula (2) of 0.30 or greater, is preferred as the printing substrate.

The amount of the inorganic particles within the coating layer is preferably within a range from 2.0 to 6.0 $g/m^2$, and more preferably from 2.0 to 4.0 $g/m^2$.

If the amount of the inorganic particles within the coating layer is less than 2.0 $g/m^2$, then an insufficient ink absorption volume during inkjet printing may result in problems such as ink spillage, ink bleeding or color irregularities. If the amount of the inorganic particles within the coating layer is greater than 6.0 $g/m^2$, then the strength of the coating layer deteriorates and the coating layer may detach, and this detached layer may adhere to the roller causing contamination, may contaminate the inside of the printer, or may cause secondary damage. Further, during inkjet printing, because the dot diameter is very small, a deterioration in the coloring density may occur.

The amount of the inorganic particles within the coating layer can be adjusted by altering the inorganic particle content of the coating liquid, altering the amount of the coating liquid applied, or altering the number of application repetitions of the coating liquid.

The printing substrate having a total surface free energy calculated from the Kaelble-Uy theoretical formula of 30 to 50 mN/m, having a dispersive component ratio of 0.80 to 1.0, and having a liquid absorption property for the inorganic particles represented by the formula (2) of 0.30 or greater may be a substrate prepared by applying a coating liquid containing the inorganic particles to a support.

The above coating liquid is preferably applied to the support in an amount that provides 2.0 to 6.0 $g/m^2$ of the inorganic particles. An amount that provides 2.0 to 4.0 $g/m^2$ of the inorganic particles is more preferred.

One embodiment of the present invention is described below in further detail.

1. Non-Aqueous Ink

The non-aqueous ink used in the present invention is composed mainly of a non-aqueous solvent and a coloring material, but provided the total surface free energy of the non-aqueous ink is within a range from 25 to 30 mN/m and the dispersive component ratio represented by the formula (1) shown below is within a range from 0.55 to 0.75, the non-aqueous ink may also include other components if necessary.

$$\text{Dispersive component ratio } \gamma dr = \gamma d/\gamma \qquad \text{Formula (1)}$$

γdr: dispersive component ratio

γd: surface free energy of dispersive component

γ: total surface free energy

The dispersive component ratio of the non-aqueous ink is more preferably within a range from 0.60 to 0.70.

1-1. Non-Aqueous Solvent

There are no particular limitations on the non-aqueous solvent, provided it functions as a solvent or vehicle for the ink, and both volatile solvents and refractory-volatile solvents may be used. However, in the present invention, from an environmental viewpoint, the non-aqueous solvent preferably contains mainly a refractory-volatile solvent. The boiling point of the refractory-volatile solvent is preferably 200° C. or higher, and more preferably 240° C. or higher. The use of a solvent having a solubility parameter (SP value) of at least 6.5 $(cal/cm^3)^{1/2}$ but not more than 10.0 $(cal/cm^3)^{1/2}$ is preferred, and the use a solvent having an SP value of at least 7.0 $(cal/cm^3)^{1/2}$ but not more than 9.0 $(cal/cm^3)^{1/2}$ is more preferred.

The non-aqueous solvent may use both non-polar organic solvents and polar organic solvents. These solvents may be used individually, or in combinations of two or more solvents, provided the solvents form a single phase. In the present invention, the use of a combination of a non-polar organic solvent and a polar organic solvent is preferred, and the mixed solvent preferably comprises 20 to 80% by mass of the non-polar solvent and 80 to 20% by mass of the polar solvent, and more preferably comprises 30 to 70% by mass of the non-polar solvent and 70 to 30% by mass of the polar solvent.

1-1-1. Non-Polar Solvent

Examples of solvents that may be used as the non-polar organic solvent include petroleum-based hydrocarbon solvents such as naphthene-based solvents, paraffin-based solvents and isoparaffin-based solvents, and specific examples include aliphatic saturated hydrocarbons such as dodecane, Isopar and Exxsol (both product names) manufactured by Exxon Mobil Corporation, AF Solvent and Normal Paraffin H (both product names) manufactured by JX Nippon Oil & Energy Corporation, and Sunthene and Sunpar (both product names) manufactured by Sunoco Inc. These solvents may be used individually, or within combinations containing two or more solvents.

1-1-2. Polar Solvent

Examples of the polar organic solvent include ester-based solvents, alcohol-based solvents, fatty acid-based solvents and ether-based solvents. These solvents may be used individually, or within combinations containing two or more solvents.

Examples of the ester-based solvents include higher fatty acid esters having at least 5 carbon atoms, and preferably 9 or more carbon atoms within each molecule, and higher fatty acid esters having 12 to 32 carbon atoms within each molecule are particularly desirable. Specific examples include isodecyl isononanoate, isotridecyl isononanoate, isononyl isononanoate, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylolpropane tri-2-ethylhexanoate and glyceryl tri-2-ethylhexanoate.

Examples of the alcohol-based solvents include aliphatic higher alcohols having 12 or more carbon atoms within each molecule, and specific examples include higher alcohols such as isomyristyl alcohol, isopalmityl alcohol, isostearyl alcohol and oleyl alcohol.

Examples of the fatty acid-based solvents include fatty acids having 4 or more carbon atoms, and preferably 9 to 22 carbon atoms, within each molecule, and specific examples include isononanoic acid, isomyristic, acid, hexadecanoic acid, isopalmitic acid, oleic acid and isostearic acid.

Examples of the ether-based solvents include glycol ethers such as diethylene glycol monobutyl ether, ethylene glycol monobutyl ether, propylene glycol monobutyl ether and propylene glycol dibutyl ether, as well as acetates of glycol ethers.

1-2. Coloring Material

There are no particular limitations on the coloring material, provided it can be dissolved or dispersed within the ink solvent, and both dyes and pigments may be used. However, in the present invention, from the viewpoint of forming superior images, the coloring material preferably contains a pigment as the main component.

1-2-1. Pigment

There are no particular limitations on the pigment, and any of the pigments typically used in the technical field of printing can be used, including organic pigments and inorganic pigments. Specific examples of pigments that can be used favorably include carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxazine pigments, threne pigments, perylene pigments, thioindigo pigments, quinophthalone pigments and metal complex pigments. These pigments may be used individually, or two or more pigments may be used in combination.

The pigment is preferably included in an amount within a range from 0.01 to 20% by mass relative to the total mass of the non-aqueous ink.

1-2-2. Dye

Conventional dyes may be used as the dye used in the ink of the present invention, including azo dyes, metal complex dyes, naphthol dyes, anthraquinone dyes, indigo dyes, carbonium dyes, quinone imine dyes, xanthene dyes, cyanine dyes, quinoline dyes, nitro dyes, nitroso dyes, benzoquinone dyes, naphthoquinone dyes, phthalocyanine dyes and metal phthalocyanine dyes. These dyes may be used individually, or may be combined as appropriate. The amount of the dye is preferably within a range from 0.1 to 20% by mass, and more preferably from 1 to 10% by mass, relative to the total mass of the ink. If the amount of the dye is less than 0.1% by mass, then the print density tends to deteriorate markedly, whereas even if the amount of the dye is increased to greater than 20% by mass, the improvement in the image density does not justify the increased costs.

1-3. Pigment Dispersant

In those cases where a pigment is used as the coloring material, a pigment dispersant is preferably added to the non-aqueous ink to improve the dispersion of the pigment within the non-aqueous ink. There are no particular limitations on the pigment dispersant used in the present invention, provided it is capable of stably dispersing the pigment within the solvent. Examples of pigment dispersants that can be used favorably include hydroxyl group-containing carboxylate esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethanes, modified polyacrylates, polyetherester type anionic surfactants, naphthalene sulfonic acid formalin condensate salts, polyoxyethylene alkyl phosphate esters, polyoxyethylene nonylphenyl ether, polyesterpolyamines and stearylamine acetate, and among these, the use of a high molecular weight dispersant is preferred.

Specific examples of the pigment dispersant include Solsperse 5000 (a phthalocyanine ammonium salt-based dispersant), 13940 (a polyester amine-based dispersant), 17000 and 18000 (aliphatic amine-based dispersants), and 11200, 22000, 24000 and 28000 (all product names) manufactured by Lubrizol Japan Ltd., Efka 400, 401, 402, 403, 450, 451 and 453 (modified polyacrylates), and 46, 47, 48, 49, 4010 and 4055 (modified polyurethanes) (all product names) manufactured by Efka Chemicals, Demol P and EP, Poiz 520, 521 and 530, and Homogenol L-18 (polycarboxylate polymeric surfactants) (all product names) manufactured by Kao Corporation, Disparlon KS-860 and KS-873N4 (high molecular weight polyester amine salts) (all product names) manufactured by Kusumoto Chemicals, Ltd., and Discol 202, 206, OA-202 and OA-600 (multi-chain polymeric nonionic dispersants) (all product names) manufactured by Daiichi Kogyo Seiyaku Co., Ltd.

Of the above pigment dispersants, a polyamide-based dispersant that has a comb-like structure comprising a plurality of side chains each composed of a polyester chain is preferably used. This polyamide-based dispersant having a comb-like structure comprising a plurality of side chains each composed of a polyester chain is a compound having a main chain containing a plurality of nitrogen atoms, such as a polyethyleneimine, and having a plurality of side chains bonded to the nitrogen atoms via amide linkages, wherein the side chains are polyester chains. Examples include dispersants with a structure having a main chain composed of a polyalkyleneimine such as polyethyleneimine, to which 3 to 80 poly(carbonyl-$C_3$-$C_6$-alkyleneoxy) chains are bonded as side chains via amide linkages per molecule, as disclosed in JP 05-177123 A. The above-mentioned products Solsperse 11200 and Solsperse 28000 (both product names) manufactured by Lubrizol Japan Ltd. are polyamide-based dispersants having the type of comb-shaped structure described above.

The amount of the pigment dispersant need only be sufficient to enable satisfactory dispersion of the above pigment within the non-aqueous solvent, and may be set as appropriate.

1-4. Other Components

Other components besides the above-mentioned non-aqueous solvent, pigment, dye and pigment dispersant may also be added to the non-aqueous ink of the present invention, provided they have no adverse effects on the properties of the ink, and examples of these other components include surfactants, fixing agents and preservatives and the like.

1-5. Method of Producing Non-Aqueous Ink

The non-aqueous ink of the present invention can be prepared by placing the various components in a conventional dispersion device such as a beads mill, either in a single batch or in portions, dispersing the components in the device, and then passing the ink through a conventional filtration device such as a membrane filter if required. For example, the ink may be prepared by first preparing a uniform mixture containing a portion of the non-aqueous solvent and all of the pigment, dispersing this mixture using a dispersion device, and then adding the remaining components to the dispersion and passing the resulting ink through a filtration device.

2. Printing Substrate

The printing substrate used in the present invention has a coating layer comprising inorganic particles, wherein the printing substrate has a total surface free energy of 30 to 50 mN/m, has a dispersive component ratio represented by the formula (1) of 0.80 to 1.0, and exhibits a liquid absorption property for the organic particles represented by the formula (2) of 0.30 or greater.

Dispersive component ratio $\gamma dr=\gamma d/\gamma$ Formula (1)

γdr: dispersive component ratio

γd: surface free energy of dispersive component

γ: total surface free energy

Liquid absorption property of inorganic particles: $A=B/C$ Formula (2)

A: liquid absorption property of inorganic particles

B: oil absorption of inorganic particles (ml/100 g)

C: specific surface area of inorganic particles ($m^2/g$)

The oil absorption of the inorganic particles, represented by B, refers to a value obtained in accordance with the linseed oil absorption measurement method prescribed in JIS K5101-21, and the specific surface area of the inorganic particles, represented by C, refers to a value obtained by a method of measuring the specific surface area using the BET method.

The dispersive component ratio of the printing substrate is preferably within a range from 0.90 to 1.0.

In the present invention, the printing substrate is a substrate prepared by forming a coating layer comprising inorganic particles on a support, and examples of the support for the printing substrate include plain papers, glossy papers, specialty papers, fabrics, films and OHP sheets, although this is not an exhaustive list. According to the present invention, even when printing is performed to a plain paper, penetration of the pigment into the printing substrate can be prevented, enabling the pigment to be retained on the surface of the printing substrate, and this offers the considerable advantages of improved print density and a reduction in strike-through.

2-1. Inorganic Particles

The types of inorganic particles typically used as extender pigments can be used as the inorganic particles, and specific examples include inorganic particles of silica, calcium carbonate, barium sulfate, titanium oxide, alumina white, aluminum hydroxide, white clay, talc, clay, diatomaceous earth, kaolin and mica. The average particle size of these inorganic particles is preferably at least 1 μm but not more than 20 μm, is more preferably at least 1 μm but not more than 15 μm, and is still more preferably at least 1 μm but not more than 13 μm. If the average particle size is less than 1 μm or greater than 20 μm, then a satisfactory improvement in the image density may not be obtainable.

The printing substrate of the present invention may be prepared by forming the coating layer comprising the inorganic particles by applying a coating liquid containing the inorganic particles to the support within an in-line arrangement with the printer.

The inorganic particles are preferably included within the coating liquid in an amount within a range from 0.01 to 40% by mass, and more preferably from 5 to 30% by mass, relative to the total mass of the coating liquid. If the amount of the inorganic particles is less than 0.01% by mass, then application of the coating liquid must be repeated to obtain the desired printing substrate, meaning the operating efficiency tends to deteriorate. In contrast, if the amount of the inorganic particles exceeds 40% by mass of the total mass of the coating liquid, then the fluidity of the coating liquid worsens and uniform application of the coating liquid becomes difficult, resulting in a deterioration in operating efficiency.

Besides the inorganic particles, the coating liquid preferably also includes a solvent and a polymeric compound.

2-2. Solvent

Solvents that can be used in the coating liquid may be selected from the group consisting of water and organic solvents. The organic solvents may be water-soluble organic solvents or water-insoluble organic solvents, but preferably have a solubility parameter within the range described below.

The use of an organic solvent having a solubility parameter (SP value) of at least 7.5 $(cal/cm^3)^{1/2}$ but not more than 17.0 $(cal/cm^3)^{1/2}$ is preferred, and the use an organic solvent having an SP value of at least 8.0 $(cal/cm^3)^{1/2}$ but not more than 17.0 $(cal/cm^3)^{1/2}$ is more preferred. Further, the difference between the SP value of the solvent of the coating liquid and the SP value of the ink is preferably at least 1.0 $(cal/cm^3)^{1/2}$. If this difference between the SP values is too small, then the effects, within the printing substrate, of residual solvent and the dispersant used in dispersing the inorganic particles tend to facilitate penetration of the ink into the substrate, which may result in a deterioration in the ink concealing properties, insufficient improvement in the print density, and the occurrence of strike-through or bleeding.

Examples of water-soluble organic solvents include glycol-based solvents, glycol ethers, glycol ether acetates, lower alcohols, glycerol, diglycerol, triglycerol, polyglycerol, imidazolidinone-based solvents and 3-methyl-2,4-pentanediol. These organic solvents may be used individually, or in combinations of two or more solvents, provided the solvents form a single phase.

Examples of the glycol-based solvents include alkylene glycols such as ethylene glycol, diethylene glycol, triethylene glycol and propylene glycol.

Examples of the glycol ethers include alkylene glycol alkyl ethers and polyalkylene glycol alkyl ethers (in the present description, both of these are referred to using the generic term "(poly)alkylene glycol alkyl ether"), and specific examples include compounds represented by a chemical formula (1) shown below.

[Chemical Formula 1]

$$R^1—O(C_2H_4—O)_n—R^2 \quad (1)$$

In the formula (1), each of $R^1$ and $R^2$ independently represents a hydrogen atom or an alkyl group of 1 to 6 carbon atoms, and preferably 4 to 6 carbon atoms, and n represents an integer of 1 to 4.

Specific examples of the (poly)alkylene glycol alkyl ethers represented by the above chemical formula (1) include ethylene glycol monobutyl ether, diethylene glycol monomethyl ether, diethylene glycol monoethyl ether, diethylene glycol monopropyl ether, diethylene glycol monobutyl ether, triethylene glycol monopropyl ether, triethylene glycol monobutyl ether, triethylene glycol monohexyl ether, tetraethylene glycol monomethyl ether, tetraethylene glycol monoethyl ether, tetraethylene glycol monopropyl ether, tetraethylene glycol monobutyl ether, diethylene glycol diethyl ether, diethylene glycol dibutyl ether, triethylene glycol diethyl ether and triethylene glycol dibutyl ether.

Specific examples of other (poly)alkylene glycol alkyl ethers include compounds represented by a chemical formula (2) shown below.

[Chemical Formula 2]

$$R^1—O(C_3H_6—O)_n—R^2 \quad (2)$$

In the formula (2), each of $R^1$ and $R^2$ independently represents a hydrogen atom or an alkyl group of 1 to 6 carbon atoms, and preferably 4 to 6 carbon atoms, and n represents an integer of 1 to 4.

Specific examples of the (poly)alkylene glycol alkyl ethers represented by the above chemical formula (2) include propylene glycol monobutyl ether, propylene glycol dibutyl ether, dipropylene glycol monomethyl ether, dipropylene glycol monoethyl ether, dipropylene glycol monopropyl ether, dipropylene glycol monobutyl ether, tripropylene glycol monopropyl ether, tripropylene glycol monobutyl ether, tetrapropylene glycol monomethyl ether, dipropylene glycol dibutyl ether and tripropylene glycol dibutyl ether.

Examples of the lower alcohols include aliphatic alcohols having 1 to 6 carbon atoms within each molecule, and specific examples include ethyl alcohol, propyl alcohol, isopropyl alcohol and butyl alcohol.

Among these water-soluble organic solvents, glycol-based solvents, glycol ethers, glycerol, diglycerol, triglycerol and polyglycerol are preferred.

Specific examples of water-insoluble organic solvents include dimethyl carbonate and diethyl carbonate.

2-3. Polymeric Compound

Examples of the polymeric compound include various water-soluble polymers and water-dispersible polymers. Here, a polymeric compound describes a compound having a molecular weight of 500 or more. Specific examples of the polymeric compound include acrylic acid-based copolymers such as sodium polyacrylate and polyacrylic acid, acrylic/maleic acid copolymers, acrylic/styrene copolymers, polyurethane, polyester, polyvinyl alcohol, polyvinyl chloride, polyvinyl acetate, styrene-butadiene rubber (SBR), starch, alkyd resins, polyacrylamide and polyvinyl acetal.

When water is used as the solvent for the coating liquid, a polyvinyl alcohol is preferably used as the polymeric compound. The use of a polyvinyl alcohol having a polymerization degree of 500 or less and a saponification degree of 60 mol % or higher is particularly desirable. By using this type of polyvinyl alcohol, a high print density can be achieved even when printing is performed at a comparatively low resolution of 300×300 dpi. The polyvinyl alcohol is preferably included in an amount within a range from 0.3 to 6.0% by mass, and more preferably from 1.0 to 6.0% by mass, relative to the total mass of the coating liquid. If the amount of added polyvinyl alcohol is too large, then the dot size tends to increase and the brightness increases, meaning the image properties tend to deteriorate. In contrast, if the amount of added polyvinyl alcohol is too small, then the strength of the coating layer itself tends to decrease, and the coating layer becomes prone to detachment from the surface of the printing substrate.

2-4. Other Components

Other components besides the above-mentioned solvent, inorganic particles and polymeric compound may also be added to the coating liquid used in the present invention, provided they have no adverse effects on the properties of the coating liquid, and examples of these other components include dispersants, surfactants, preservatives and antifoaming agents and the like.

2-5. Method of Producing Printing Substrate

The printing substrate of the present invention is obtained by forming the coating layer containing the inorganic particles on a support. A typical plain paper, cardboard or film or the like can be used as the support. One layer or multiple layers of the coating liquid are applied to at least one surface of the support. There are no particular limitations on the drying method used following application of the coating liquid, and examples include hot air drying, infrared drying and drum drying. Following drying of the coating layer, a treatment such as machine calendering, super calendering or soft calendering may be performed if required. In the present invention, there are no particular limitations on the methods used. If the printing apparatus and the coating apparatus can be arranged in an in-line manner, then the effects of the present invention can be obtained for all manner of supports in a short period of time, which is particularly desirable.

2-5-1. Method of Producing Coating Liquid

The coating liquid used in the present invention can be prepared by placing all of the components in a conventional dispersion device such as a beads mill, either in a single batch or in portions, dispersing the components in the device, and then passing the liquid through a conventional filtration device such as a membrane filter if required. For example, the coating liquid may be prepared by first preparing a uniform mixture containing a portion of the solvent and all of the inorganic particles, dispersing this mixture using a dispersion device, and then adding the remaining components to the dispersion and passing the resulting liquid through a filtration device.

2-5-2. Method of Applying Coating Liquid

The method used for applying the coating liquid to the support may involve applying a uniform coating to the surface of the support using a conventional coating device, or more specifically, a blade coater, roll coater, air knife coater, rod coater, lip coater, curtain coater, die coater, champlex coater, brush, roller or bar coater or the like, or by printing an image onto the support using a printing device such as an inkjet printer or a gravure printer. For example, printing may be performed by using an inkjet printer to discharge the coating liquid onto the printing substrate, and then using the printer to print the non-aqueous ink on top of the applied coating liquid. In the present invention, it is preferable that following application of the coating liquid to the printing substrate, the applied liquid is allowed to penetrate into the substrate and undergo drying by evaporation before the non-aqueous ink is discharged onto the printing substrate. Accordingly, in those cases where the water content within the coating liquid is large, a drying step may be included prior to the printing of the non-aqueous ink. This drying step may employ a known drying technique, for example by blowing hot air onto the printing substrate or transporting the printing substrate beneath a heated roller following application of the coating liquid.

3. Printing Method

There are no particular limitations on the printing method used in the present invention, provided it enables the printing of the non-aqueous ink onto the printing substrate, but a printing method in which an inkjet printer is used to discharge the non-aqueous ink onto the printing substrate is preferred.

In order to enable the printing method of the present invention to be executed with ease, the printing substrate described above may be provided as the printing substrate for the non-aqueous ink.

EXAMPLES

The present invention is described in more detail below based on a series of examples, but the present invention is in no way limited by these examples.

Examples 1 to 6, Comparative Examples 1 to 4

(1) Preparation of Non-Aqueous Inks

The formulations of non-aqueous black inks are shown in Table 1. The components shown in Table 1 were premixed in the proportions shown in Table 1, zirconia beads having a diameter (ϕ) of 0.5 mm were then added to the mixture, and dispersion was conducted for 60 minutes using a rocking mill (manufactured by Seiwa Giken Co., Ltd.). The resulting dispersion was then filtered through a membrane filter (pore diameter: 3 μm) to complete preparation of a black ink.

TABLE 1

| Ink formulations | | | | | |
|---|---|---|---|---|---|
| Mass % | | Ink 1 | Ink 2 | Ink 3 | Ink 4 |
| Pigment | Carbon Black MA11 | 8 | 8 | 8 | 8 |
| Pigment | Solsperse 28000 | 2 | — | 2 | 2 |
| dispersant | Solsperse 11200 | — | 4 | — | — |
| Non- | Exceparl M-OL | 30 | 30 | 30 | 30 |
| aqueous | Exceparl IPM | 20 | 15 | — | 30 |
| solvent | Normal Paraffin H | 40 | 43 | 60 | 15 |
| | Neosolue-Aqulio | — | — | — | 15 |
| Total | | 100 | 100 | 100 | 100 |
| Polar solvent proportion (mass %) | | 56 | 51 | 33 | 83 |
| Non-polar solvent proportion (mass %) | | 44 | 49 | 67 | 17 |

Details of the materials shown in Table 1 are as follows.

Carbon black MA11: "MA-11" (product name) (carbon black), manufactured by Mitsubishi Chemical Corporation.

Solsperse 28000: "Solsperse 28000" (product name) (a pigment dispersant), manufactured by Lubrizol Japan Ltd.

Solsperse 11200: "Solsperse 11200" (product name) (a pigment dispersant), manufactured by Lubrizol Japan Ltd.

Exceparl M-OL: "Exceparl M-OL" (product name) (methyl oleate), manufactured by Kao Corporation.

Exceparl IPM: "Exceparl IPM" (product name) (isopropyl myristate), manufactured by Kao Corporation.

Normal Paraffin H: "Normal Paraffin H" (product name) (a hydrocarbon solvent) manufactured by JX Nippon Oil & Energy Corporation.

Neosolue-Aqulio: "Neosolue-Aqulio" (product name) (bis-ethoxydiglycol cyclohexane dicarboxylate), manufactured by Nippon Fine Chemical Co., Ltd.

(2) Preparation of Printing Substrates

The formulations of coating liquids for the printing substrates are shown in Table 2. The components shown in Table 2 were premixed in the proportions shown in Table 2, and each mixture was then dispersed for one minute using an ultrasonic dispersion device to obtain a coating liquid.

Using a coating roller, the coating liquid was applied to the entire surface on one side of a plain paper "Riso lightweight paper" (product name) manufactured by Riso Kagaku Corporation in an amount sufficient to obtain a predetermined amount of inorganic particles (2.7 g/m$^2$) within the coating layer, and the solvent was then dried using a heated roller, thus yielding a printing substrate.

For the printing substrate 5, the plain paper was used as is, without undergoing treatment with a coating liquid.

TABLE 2

| Formulations of coating liquids for printing substrates | | | | | | | | | | |
|---|---|---|---|---|---|---|---|---|---|---|
| | | Printing Substrate No. | | | | | | | | |
| | Mass % | 1 | 2 | 3 | 4 | 5 | 6 | 7 | 8 | 9 |
| Inorganic particles | Silica: P758C | 12.0 | 10.5 | 9.0 | 6.0 | — | 15.0 | — | — | 10.5 |
| | Silica: P73 | 3.0 | 4.5 | 6.0 | 9.0 | — | — | 15.0 | — | 4.5 |
| | $CaCo_3$: Hakuenka PZ | — | — | — | — | — | — | — | 30.0 | — |
| Dispersant | Demol EP | 4.0 | 4.0 | 4.0 | 4.0 | — | 4.0 | 4.0 | 8.0 | 4.0 |
| Polymeric compound | Polyvinyl alcohol | 5.0 | 5.0 | 5.0 | 5.0 | — | 5.0 | 5.0 | — | — |
| | Sodium polyacrylate | — | — | — | — | — | — | — | 1.0 | 1.0 |
| | Styrene/acrylic-based emulsion resin | 3.1 | 3.1 | 3.1 | 3.1 | — | 3.1 | 3.1 | 3.1 | 3.1 |
| Preservative | Surauto 33 | 0.1 | 0.1 | 0.1 | 0.1 | — | 0.1 | 0.1 | 0.1 | 0.1 |
| Anti-foaming agent | Surfynol DF-58 | 0.02 | 0.02 | 0.02 | 0.02 | — | 0.02 | 0.02 | 0.02 | 0.02 |
| Solvent | Water | 72.8 | 72.8 | 72.8 | 72.8 | — | 72.8 | 72.8 | 57.8 | 76.8 |
| Total | | 100.0 | 100.0 | 100.0 | 100.0 | — | 100.0 | 100.0 | 100.0 | 100.0 |

Details of the materials shown in Table 2 are as follows.

Silica: P758C: "Mizukasil P-758C" (product name) (a powdered silica having an average particle size of 13.0 μm), manufactured by Mizusawa Industrial Chemicals, Ltd.

Silica: P73: "Mizukasil P-73" (product name) (a powdered silica having an average particle size of 4.0 μm), manufactured by Mizusawa Industrial Chemicals, Ltd.

$CaCo_3$: Hakuenka PZ: "Hakuenka PZ" (product name) (calcium carbonate ($CaCo_3$) having an average particle size of 3.5 μm), manufactured by Shiraishi Kogyo Kaisha, Ltd.

Demol EP: "Demol EP" (product name) (a special polycarboxylic acid-based polymeric surfactant, solid fraction: 25%), manufactured by Kao Corporation.

Polyvinyl alcohol: "JMR-10M" (product name) (a polyvinyl alcohol having a saponification degree of 65.0 mol % and a polymerization degree of 250), manufactured by Japan Vam & Poval Co., Ltd.

Sodium Polyacrylate: polymerization degree 2,700 to 7,500, manufactured by Wako Pure Chemical Industries, Ltd.

Styrene/acrylic-based emulsion resin: "Mowinyl 966A" (product name) (a styrene/acrylic-based emulsion resin, solid fraction: 45%), manufactured by The Nippon Synthetic Chemical Industry Co., Ltd.

Surauto 33: "Surauto 33" (product name) (a preservative), manufactured by Japan EnviroChemicals, Ltd.

Surfynol DF-58: "Surfynol DF-58" (product name) (an antifoaming agent), manufactured by Air Products Japan, Inc.

Water: Water having an SP value of 23.4 $(cal/cm^3)^{1/2}$.

Details of the inorganic particles used in Table 2 are shown in Table 3. In Table 3, the oil absorption B of the inorganic particles refers to a value obtained in accordance with the linseed oil absorption measurement method prescribed in JIS K5101-21, whereas the specific surface area C of the inorganic particles refers to a value obtained by a method of measuring the specific surface area using the BET method. Based on the results of these measurements, the liquid absorption property A of the inorganic particles was calculated as A=B/C.

TABLE 3

Details of inorganic particles

| Type | Liquid absorption property A of inorganic particles ($\times 10^{-2}$ ml/m$^2$) | Oil absorption B of inorganic particles (ml/100 g) | Specific surface area C of inorganic particles (m$^2$/g) |
|---|---|---|---|
| Silica: P758C | 0.25 | 134 | 530 |
| Silica: P73 | 0.55 | 180 | 330 |
| $CaCo_3$: Hakuenka PZ | 3.03 | 47 | 15.5 |

(3) Printing of Non-Aqueous Inks

Using the combinations shown in Table 4 and Table 5, the non-aqueous inks shown in Table 1 were loaded into the discharge path of an inkjet printer "Orphis-X9050" (product name, manufactured by Riso Kagaku Corporation), and used to print a solid image onto the printing substrates shown in Table 2. The printing was performed at a resolution of 300×300 dpi, under conditions including an ink volume of 36 pl/dot.

(4) Evaluations

The image density and the roller transfer staining of each of the obtained printed items were measured and evaluated using the methods described below. The results are shown in Table 4 and Table 5.

(Image Density)

The printed item composed of a solid printed image was left to stand overnight, and the print image density (OD) of the surface of the solid image was measured using an optical densitometer (RD920, manufactured by Macbeth Corporation) and evaluated against the following criteria.

A: 1.20<OD value

B: 1.15<OD value≤1.20

C: OD value≤1.15

(Roller Transfer Staining)

Immediately following printing of the solid image, a sheet of double-sided matte paper ("Riso Matte IJ(W) paper" (product name), manufactured by Riso Kagaku Corporation) was laid on top of the printed item, a plastic roller was rolled back and forth five times over the sheets of paper, and the degree of staining transferred to the double-sided matte paper was evaluated visually against the following criteria.

AA: no staining was observed

A: staining was very minimal, and almost unnoticeable

B: slightly noticeable staining

C: heavy staining (5) Measurement of Physical Properties of Non-Aqueous Inks and Printing Substrates The total surface energy and dispersive component ratio were measured for each of the non-aqueous inks and printing substrates. The results of the measurements are shown in Table 4 and Table 5.

(5)-1: Measurement of Total Surface Free Energy γx and Dispersive Component Ratio γxdr of Non-Aqueous Inks Using a dynamic contact angle meter DM500 manufactured by Kyowa Interface Science Co., Ltd., the surface tension (total surface free energy) γx of the non-aqueous ink and the interfacial tension γwx of the non-aqueous ink-water were measured using the pendant drop method. Based on the results of the measured surface tension γx and the interfacial tension γwx, the total surface free energy γx and the dispersive component ratio γxdr were calculated for the ink. In other words, by inserting the values for the interfacial tension γwx, the surface tension of water γw (72.8), the ink surface tension γx, the dispersive component of water γwd (21.8) and the polar component of water γwp (51.0) into the formula a1 shown below, inserting the value for the ink surface tension γx into the formula a2 shown below, and then solving the two simultaneous equations, the value for the ink dispersive component γxd and the ink polar component γxp were determined, and the ink dispersive component ratio γxdr was then calculated from the formula 3a shown below.

$$\gamma wx=\gamma w+\gamma x-2\sqrt{\gamma wd\gamma xd}-2\sqrt{\gamma wp\gamma xp} \quad (a1)$$

$$\gamma x=\gamma xd+\gamma xp \quad (a2)$$

$$\gamma xdr=\gamma xd/\gamma x \quad (a3)$$

(5)-2: Measurement of Total Surface Free Energy γs and Dispersive Component Ratio γsdr of Printing Substrates Using a dynamic contact angle meter DM500 manufactured by Kyowa Interface Science Co., Ltd., the contact angle θ1 between the printing substrate and diiodomethane and the contact angle θ2 between the printing substrate and water were each measured using the drop method, and based on the results of the measured contact angles θ, the total surface free energy γs and the dispersive component ratio γsdr were calculated for the printing substrate. In other words, by inserting the values for the contact angle θ1, and the total surface free energy (50.8), the dispersive component (48.5) and the polar component (2.3) for diiodomethane into the formula b1 shown below, also inserting the values for the contact angle θ2, and the total surface free energy (72.8), the dispersive component (21.8) and the polar component (51.0) for water into the formula b1 shown below, and then solving the two simultaneous equations, the value for the dispersive component γsd and the polar component γsp for the printing substrate were determined, and then the total surface free energy γs for the printing substrate was calculated from the formula b2 shown below, and the dispersive component ratio γsdr for the printing substrate was calculated from the formula b3 shown below.

$$\gamma l(1+\cos\theta)=2\sqrt{\gamma sd\gamma ld}+2\sqrt{\gamma sp\gamma lp} \quad \text{(b1)}$$

$$\gamma s=\gamma sd+\gamma sp \quad \text{(b2)}$$

$$\gamma sdr=\gamma sd/\gamma s \quad \text{(b3)}$$

In examples 1 to 7, which represent the printing method of the present invention, the image density was high and roller transfer staining was minimal. In this manner, by controlling the affinity between the non-aqueous ink and the printing substrate, and controlling the liquid absorption property of the inorganic particles, a high image density can be obtained and roller transfer staining can be suppressed.

In comparative example 1, although the affinity between the printing substrate and the ink was high, the liquid absorption property was poor, and therefore the image density was low and the roller transfer staining deteriorated.

In comparative example 2, the polarity of the printing substrate was outside the satisfactory range and the liquid absorption property was poor, and therefore the image density decreased.

In comparative example 3, although the liquid absorption property of the inorganic particles was favorable, the polarity

TABLE 4

Evaluation results for examples

| | | Example 1 | Example 2 | Example 3 | Example 4 | Example 5 | Example 6 | Example 7 |
|---|---|---|---|---|---|---|---|---|
| Printing substrate | Type | Printing substrate 1 | Printing substrate 2 | Printing substrate 3 | Printing substrate 4 | Printing substrate 2 | Printing substrate 2 | Printing substrate 9 |
| | Total surface free energy (mN/m) | 38.35 | 40.48 | 46.87 | 47.18 | 40.48 | 40.48 | 47.52 |
| | Dispersive component ratio | 0.91 | 0.94 | 1.00 | 0.99 | 0.94 | 0.94 | 0.95 |
| | Liquid absorption property | 0.31 | 0.34 | 0.37 | 0.43 | 0.34 | 0.34 | 0.34 |
| | Mass of inorganic particles within coating layer (g/m$^2$) | 2.7 | 2.7 | 2.7 | 2.7 | 2.7 | 2.7 | 2.7 |
| Non-aqueous ink | Type | Ink 1 | Ink 1 | Ink 1 | Ink 1 | Ink 2 | Ink 3 | Ink 1 |
| | Total surface free energy (mN/m) | 27.3 | 27.3 | 27.3 | 27.3 | 28.3 | 27.8 | 27.3 |
| | Dispersive component ratio | 0.63 | 0.63 | 0.63 | 0.63 | 0.62 | 0.68 | 0.63 |
| Evaluation results | Image density | A | A | A | A | A | A | A |
| | OD value | 1.26 | 1.30 | 1.35 | 1.35 | 1.29 | 1.28 | 1.24 |
| | Roller transfer staining | A | AA | AA | A | AA | AA | AA |

TABLE 5

Evaluation results for comparative examples

| | | Comparative example 1 | Comparative example 2 | Comparative example 3 | Comparative example 4 | Comparative example 5 |
|---|---|---|---|---|---|---|
| Printing substrate | Type | Printing substrate 5 | Printing substrate 6 | Printing substrate 7 | Printing substrate 2 | Printing substrate 8 |
| | Total surface free energy (mN/m) | 36.86 | 17.87 | 68.87 | 40.48 | 8.90 |
| | Dispersive component ratio | 0.96 | 0.99 | 0.50 | 0.94 | 0.57 |
| | Liquid absorption property | 0.00 | 0.25 | 0.55 | 0.34 | 3.03 |
| | Mass of inorganic particles within coating layer (g/m$^2$) | — | 2.7 | 2.7 | 2.7 | 2.7 |
| Non-aqueous ink | Type | Ink 1 | Ink 1 | Ink 1 | Ink 4 | Ink 1 |
| | Total surface free energy (mN/m) | 27.3 | 27.3 | 27.3 | 28.5 | 27.3 |
| | Dispersive component ratio | 0.63 | 0.63 | 0.63 | 0.34 | 0.63 |
| Evaluation results | Image density | C | C | C | A | A |
| | OD value | 1.09 | 1.02 | 1.15 | 1.28 | 1.23 |
| | Roller transfer staining | C | A | C | C | C |

was outside the satisfactory range, and therefore the image density was low and the roller transfer staining deteriorated.

In comparative example 4, the ink polarity was high, and therefore even though the polarity of the printing substrate was within the preferred range, the affinity was poor, and the roller transfer staining deteriorated.

In comparative example 5, although the liquid absorption property of the inorganic particles was favorable, the polarity was outside the satisfactory range, and therefore the roller transfer staining deteriorated.

The invention claimed is:

1. A method for printing a non-aqueous ink onto a printing substrate, using a non-aqueous ink comprising a coloring material and a non-aqueous solvent, wherein the non-aqueous ink has a total surface free energy, calculated from a Kaelble-Uy theoretical formula, of 25 to 30 mN/m, and a dispersive component ratio represented by a formula (1) shown below of 0.55 to 0.75, and the printing substrate has a coating layer comprising inorganic particles, has a total surface free energy, calculated from a Kaelble-Uy theoretical formula, of 30 to 50 mN/m, has a dispersive component ratio represented by the formula (1) of 0.80 to 1.0, and exhibits a liquid absorption property for the inorganic particles, represented by a formula (2) shown below, of 0.30 or greater:

Dispersive component ratio $\gamma dr=\gamma d/\gamma$ Formula (1)

γdr: dispersive component ratio

γd: surface free energy of dispersive component

γ: total surface free energy

Liquid absorption property of inorganic particles: $A=B/C$ Formula (2)

A: liquid absorption property of inorganic particles

B: oil absorption of inorganic particles (ml/100 g)

C: specific surface area of inorganic particles ($m^2/g$)

wherein the oil absorption represented by B refers to a value obtained in accordance with a linseed oil absorption measurement method prescribed in JIS K5101-21, and the specific surface area represented by C refers to a value obtained by a method of measuring specific surface area using a BET method.

2. The method for printing a non-aqueous ink according to claim 1, wherein an amount of the inorganic particles within the coating layer is within a range from 2.0 to 6.0 $g/m^2$.

3. The method for printing a non-aqueous ink according to claim 1, wherein the non-aqueous solvent comprises 20 to 80% by mass of a non-polar solvent and 80 to 20% by mass of a polar solvent.

4. A printing substrate for a non-aqueous ink, the non-aqueous ink comprising a coloring material and a non-aqueous solvent, and having a total surface free energy, calculated from a Kaelble-Uy theoretical formula, of 25 to 30 mN/m, and a dispersive component ratio represented by a formula (1) shown below of 0.55 to 0.75, wherein the printing substrate has a coating layer comprising inorganic particles, has a total surface free energy, calculated from a Kaelble-Uy theoretical formula, of 30 to 50 mN/m, has a dispersive component ratio represented by the formula (1) of 0.80 to 1.0, and exhibits a liquid absorption property for the organic particles, represented by a formula (2) shown below, of 0.30 or greater:

Dispersive component ratio $\gamma dr=\gamma d/\gamma$ Formula (1)

γdr: dispersive component ratio

γd: surface free energy of dispersive component

γ: total surface free energy

Liquid absorption property of inorganic particles: $A=B/C$ Formula (2)

A: liquid absorption property of inorganic particles

B: oil absorption of inorganic particles (ml/100 g)

C: specific surface area of inorganic particles ($m^2/g$)

wherein the oil absorption represented by B refers to a value obtained in accordance with a linseed oil absorption measurement method prescribed in JIS K5101-21, and the specific surface area represented by C refers to a value obtained by a method of measuring specific surface area using a BET method.

5. The printing substrate for a non-aqueous ink according to claim 4, wherein an amount of the inorganic particles within the coating layer is within a range from 2.0 to 6.0 $g/m^2$.

6. The printing substrate for a non-aqueous ink according to claim 4, wherein the non-aqueous solvent for the non-aqueous ink comprises 20 to 80% by mass of a non-polar solvent and 80 to 20% by mass of a polar solvent.

* * * * *